Oct. 22, 1929.    F. J. SCHULZE    1,732,284
TREE HOLDER
Filed May 18, 1929    2 Sheets-Sheet 2
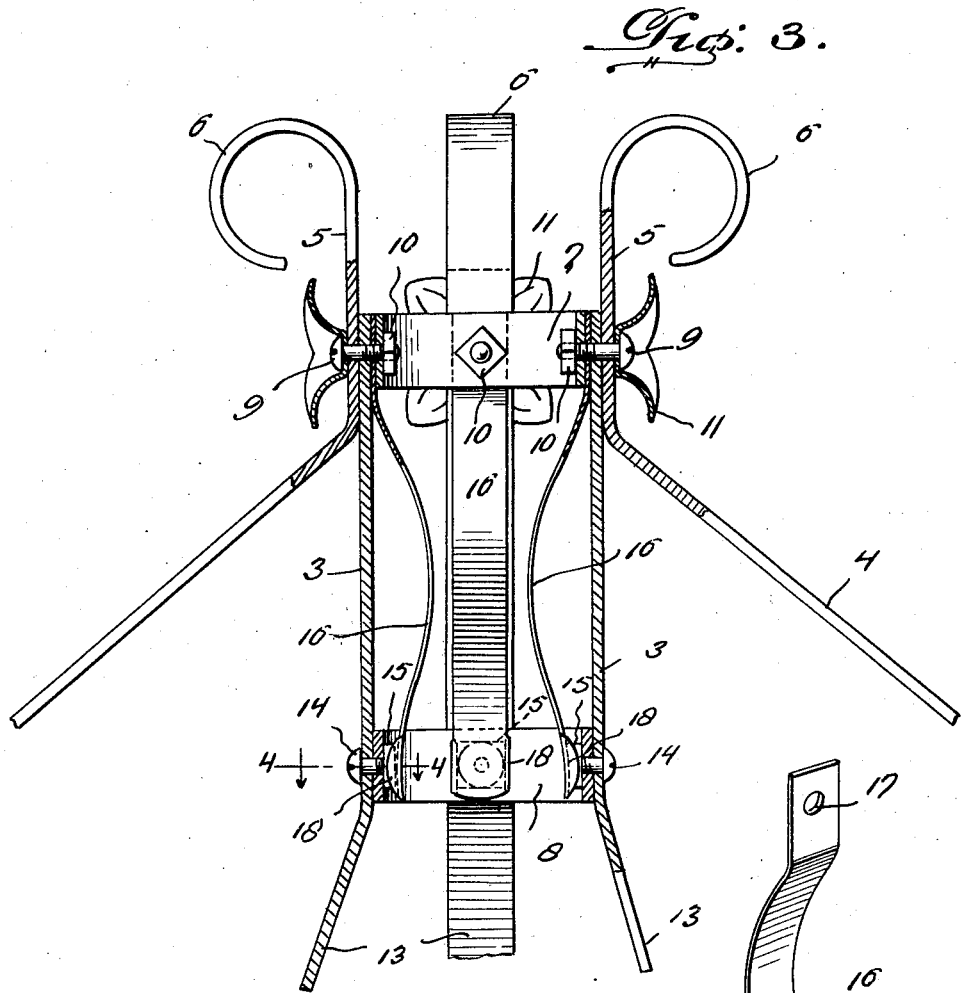
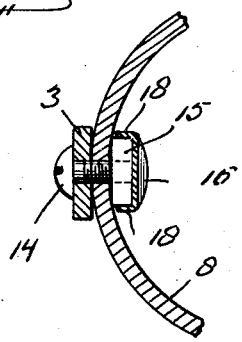
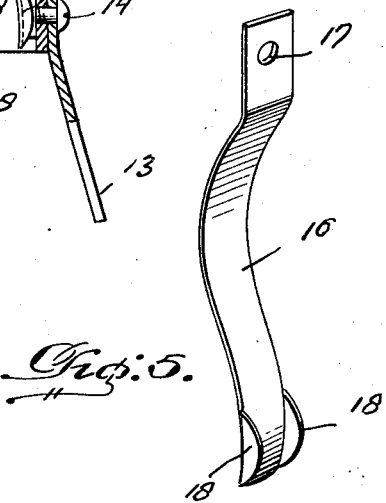
Francis J. Schulze,
INVENTOR.
BY *J Stanley Burch*
ATTORNEY.

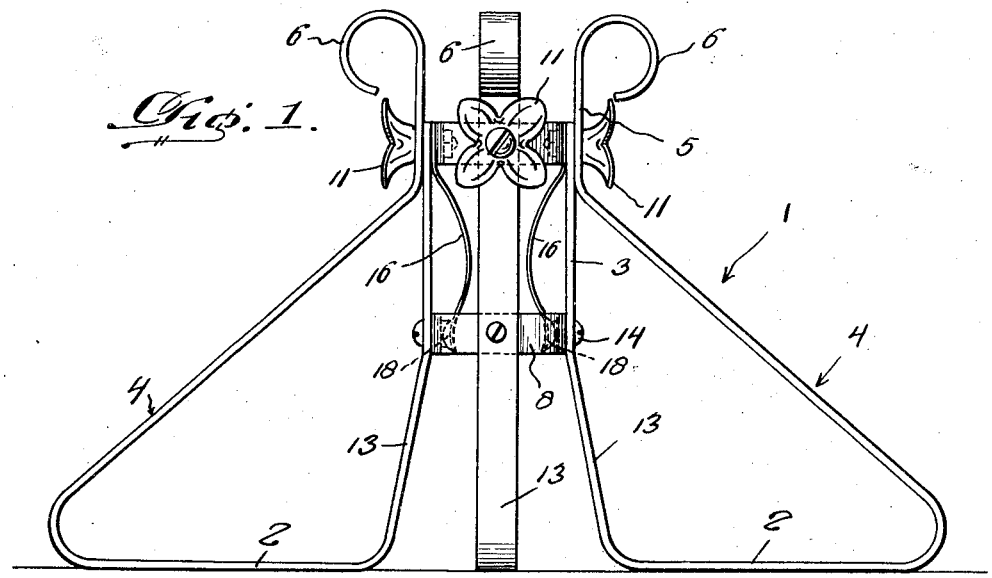
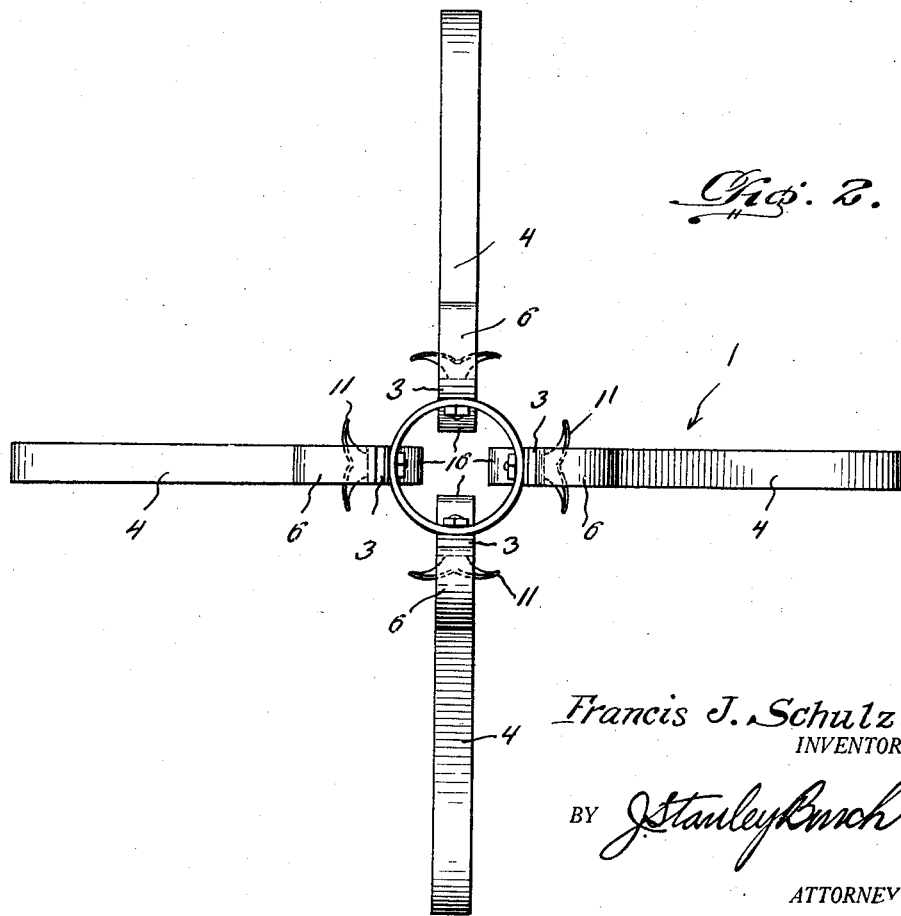

Patented Oct. 22, 1929

1,732,284

UNITED STATES PATENT OFFICE

FRANCIS JOSEPH SCHULZE, OF CHICAGO, ILLINOIS

TREE HOLDER

Application filed May 18, 1929. Serial No. 364,262.

The present invention relates to improvements in supports, and has reference more particularly to a Christmas tree holder.

One of the important objects of the present invention is to provide a tree holder wherein means is employed for centering the tree trunk in addition to supporting the same in a rigid upright position.

A still further object is to provide a tree holder wherein the centering and supporting means for the tree trunk constitutes a series of leaf springs connected at their upper ends to the respective supporting legs, means being associated with the free end of each leaf spring for normally locking the nut threaded on the inner end of the bolt that supports the lower ring from becoming disengaged from said bolt.

Another important object is to provide a tree holder of the above-mentioned character that may be constructed of an ornamental design so as to render the device particularly appropriate for parlors where Christmas trees are displayed.

A further object is to provide a tree holder of the above-mentioned character which is simple in construction, inexpensive, strong and durable and further well adapted for the purposes for which it is designed.

Other objects and advantages of the invention will become apparent from the following description when taken in connection with the accompanying drawings.

In the accompanying drawings wherein like reference characters indicate corresponding parts throughout the same:

Figure 1 is a side elevation of the tree holder embodying my invention.

Figure 2 is a top plan view thereof.

Figure 3 is an enlarged detail vertical sectional view for more clearly disclosing the construction of the tree trunk centering and supporting leaf springs.

Figure 4 is a transverse section taken substantially on the line 4—4 of Figure 3 looking in the direction of the arrows; and Figure 5 is a detail perspective view of one of the leaf springs forming a salient part of the present invention.

In the drawings wherein for the purpose of illustration is shown the preferred embodiment of my invention, the numeral 1 designates generally my improved tree holder, the same comprising a plurality of complementary supporting legs arranged in equidistantly spaced relation with respect to each other and as the construction of the legs are identical, the description of one is thought to suffice for the description of all. There are in the present instance, four of such legs provided and each is formed from a strip of wrought metal and comprises a lower straight horizontal portion 2 from the inner end of which extends upwardly the upright portion 3 while at its outer end, said lower horizontal portion 2 is connected with an inclined brace portion 4. This brace portion terminates at its upper end in the vertically disposed portion 5 that abuts against and is secured to the outer face of the upper end portion of the upright inner end portion 3 and the upper extremity of this vertically disposed portion 5 terminates in the downwardly and outwardly curved portion 6.

The several legs are disposed around the upper and lower rings 7 and 8 respectively and suitable bolts 9 extend through the vertical portions 5, the upper ends of the upright portions 3 and the ring 7. A nut 10 is threaded on the inner end of each bolt while an ornamental washer 11 is mounted on each bolt in position against the outer face of the vertical portion 5 of each leg member as clearly shown in Figure 3. Upon referring to Figures 1 and 3 it will be observed that the lower portions 13 of the upright elements 3 diverge gradually toward the floor and the lower ring 8 is secured to the upright portions 3 directly above the diverging portions 13. The fastening means for the lower ring 8 also includes bolts 14 that extend through the upright portions 3 and the ring 8, suitable nuts 15 being threaded on the inner ends of the bolts.

A leaf spring 16 is secured at its upper end between the upper extremity of each upright portion 3 and the upper ring 7 and to this end, the upper end of each leaf spring is formed with an opening 17 to accommodate the bolt 9. Said leaf springs are bowed inwardly and the free ends of the leaf springs are formed with laterally disposed ears 18 at their side edges for engagement with the opposite sides of the respective nuts 15 in the manner as clearly suggested in Figures 3 and 4 of the drawings whereby to lock said nuts against accidental disengagement from the inner ends of the bolts 14. These laterally disposed ears 18 will however permit the sliding movement of the leaf springs when the trunk of a tree is inserted downwardly in the holder.

The leaf springs cooperate to center the tree trunk when the latter is positioned in the holder and furthermore will support the tree in an upright position, the springs being placed under compression when in contact with the tree and as a result of this close frictional contact with the tree trunk, the leaf springs will relieve a portion of the weight and transfer it to the legs.

It will thus be seen from the foregoing description, that I have provided a tree holder that can be employed for receiving different sizes of trees and said holder will at all times be positive and efficient in properly supporting the tree in an upright portion for decorative purposes.

The simplicity of my device enables the same to be constructed at a very low cost and yet be strong and durable.

While I have shown the preferred embodiment of my invention, it is to be understood that minor changes in the size, shape and arrangement of parts may be resorted to without departing from the spirit of the invention or the scope of the appended claims.

What I claim is:

1. In a tree holder, upper and lower horizontally disposed rings, a series of radially disposed supporting legs, bolts extending through the supporting legs and the respective rings, nuts threaded on the inner ends of the bolts for engagement with the respective rings, inwardly bowed leaf springs connected at their upper ends to the supporting legs at their point of connection with the upper ring, the free ends of the leaf springs being disposed axially through the lower ring, said leaf springs cooperating with each other to center and support a tree trunk in the holder, and means formed on the lower end of each leaf spring for cooperation with the adjacent nuts to prevent turning of the same on its bolt.

2. In a tree holder, upper and lower horizontally disposed rings, a series of radially disposed supporting legs, bolts extending through the supporting legs and the respective rings, nuts threaded on the inner ends of the bolts for engagement with the respective rings, inwardly bowed leaf springs connected at their upper ends to the supporting legs at their point of connection with the upper ring, the free ends of the leaf springs being disposed axially through the lower ring, said leaf springs cooperating with each other to center and support a tree trunk in the holder, and means formed on the lower end of each leaf spring for cooperation with the adjacent nuts to prevent turning of the same on its bolt, said last-mentioned means comprising laterally disposed ears formed on the side edges of each leaf spring at the lower end thereof and having slidable engagement with the opposite sides of the respective nuts.

In testimony whereof I affix my signature.

FRANCIS JOSEPH SCHULZE.